(12) United States Patent
Lim et al.

(10) Patent No.: US 8,884,880 B2
(45) Date of Patent: Nov. 11, 2014

(54) APPARATUS AND METHOD FOR PROVIDING VISUAL-HAPTIC INFORMATION, AND TERMINAL HAVING THE SAME

(75) Inventors: Jeong-Mook Lim, Daejeon (KR); Ki-Uk Kyung, Daejeon (KR); Hee-Sook Shin, Daejeon (KR); Yo-An Lim, Gwangju (KR); Dong-Woo Lee, Daejeon (KR)

(73) Assignee: Electronics and Telecommunciations Research Institute, Daejeon (KR)

( * ) Notice: Subject to any disclaimer, the term of this patent is extended or adjusted under 35 U.S.C. 154(b) by 376 days.

(21) Appl. No.: 13/328,025

(22) Filed: Dec. 16, 2011

(65) Prior Publication Data

US 2012/0154286 A1   Jun. 21, 2012

(30) Foreign Application Priority Data

Dec. 17, 2010   (KR) .................. 10-2010-0130035

(51) Int. Cl.
*G06F 3/02* (2006.01)
*G06F 3/01* (2006.01)
*G06F 3/023* (2006.01)

(52) U.S. Cl.
CPC .............. *G06F 3/016* (2013.01); *G06F 3/0238* (2013.01)
USPC ...................................... 345/168; 340/407.1

(58) Field of Classification Search
None
See application file for complete search history.

(56) References Cited

U.S. PATENT DOCUMENTS

| | | | |
|---|---|---|---|
| 7,253,807 B2 * | 8/2007 | Nakajima | 345/173 |
| 7,382,357 B2 * | 6/2008 | Panotopoulos et al. | 345/168 |
| 8,199,124 B2 * | 6/2012 | Ciesla et al. | 345/173 |
| 2009/0128376 A1 * | 5/2009 | Caine et al. | 341/34 |
| 2010/0141606 A1 | 6/2010 | Bae et al. | |

FOREIGN PATENT DOCUMENTS

| | | |
|---|---|---|
| KR | 100710362 B1 | 4/2007 |
| KR | 1020080112687 A | 12/2008 |
| KR | 1020100065640 A | 6/2010 |

* cited by examiner

*Primary Examiner* — Jason Olson
(74) *Attorney, Agent, or Firm* — William Park & Associates Patent Ltd.

(57) ABSTRACT

A terminal for providing visual-haptic information includes a visual-haptic keypad that displays and provides the visual-haptic information. The visual-haptic keypad includes: a button frame of a plurality of buttons provided in the visual-haptic keypad; a visual display layer positioned under the button frame in a vertical direction on a basis of the button frame; and a haptic display layer positioned under the visual display layer in the vertical direction on the basis of the button frame. The button frame and the visual display layer are fixedly bonded to boundary portions of the plurality of buttons.

20 Claims, 4 Drawing Sheets

APPARATUS AND METHOD FOR PROVIDING VISUAL-HAPTIC INFORMATION, AND TERMINAL HAVING THE SAME

CROSS-REFERENCE TO RELATED APPLICATIONS

The present application claims priority of Korean Patent Application No. 10-2010-0130035, filed on Dec. 17, 2010, which is incorporated herein by reference in its entirety.

BACKGROUND OF THE INVENTION

1. Field of the Invention

Exemplary embodiments of the present invention relate to input/output of visual-haptic information, and more particularly, to an apparatus and a method for providing users with visual-haptic information through a visual-haptic keypad, an apparatus for providing the visual-haptic information, and a terminal provided with the visual-haptic keypad.

2. Description of Related Art

At the present time, in most terminals, a plurality of function keys including a keypad for the input of numerals or characters are provided in the form of buttons, and a terminal provided with buttons actually provides users with the same sense of manipulation (sense of button touch) with respect to all buttons of the terminal regardless of software, program and the like currently running in the terminal. Furthermore, button icons representing the meaning of the buttons provided in the terminal are attached to corresponding buttons in the form of numerals, the Korean alphabet, English characters, special characters and the like.

The terminal having the buttons as described above performs various functions such as short message creation, an electronic organizer and a game function in a phone book, a cell phone and the like, a user inputs information through the buttons when software, program and the like for performing the functions of the terminal are run (driven), and the terminal outputs information such that the user can easily perform the above-mentioned functions according to the information which is input by the user. Specifically, when a user does not simply input characters or numerals, for example, when the user drives software or program such as game, it is necessary for the user to naturally map the meaning of button icons attached to buttons with the meaning of function keys to be used in the game.

However, in the current terminal, when driving the software or program through the buttons, since it is difficult to map the meaning of the button icon attached to the button with the meaning of the function key to be used when driving the software or program, it is not easy to drive the software or program of the terminal for allowing users to use various functions of the terminal.

In addition, a terminal provided on the front surface thereof with a touchscreen provides a soft button function performed by software or program without using buttons, and inputs/outputs information by manipulating button icons in a more flexible manner such as changing of button icons according to currently driven software or program.

However, when inputting/outputting information by manipulating the button icons through the soft button function as described above, since a user makes contact with a separate panel in order to touch a soft button for the input of information to the terminal, it is particularly difficult to change button icons and a sense of button manipulation (a sense of button touch) according to the functions of buttons to be used in software or program which is being driven in order to use the functions of the terminal, resulting in a limitation in providing visual information and haptic information, that is, visual-haptic information, to users using the functions of the terminal by driving corresponding software or program.

In this regard, when a user uses the terminal having various functions as described above, in other words, when driving corresponding software or program in order to use the functions of the terminal, it is necessary to provide a method for allowing users to easily drive the corresponding software or program by easily mapping the meaning of button icons attached to buttons with the meaning of function keys to be used when driving the software or program, thereby allowing the users to easily use the functions of the terminal. In addition, it is necessary to provide a method for easily changing button icons and a sense of button manipulation (a sense of button touch) according to the functions of buttons to be used in software or program which is being driven in order to use the functions of the terminal, and easily providing users with visual information and haptic information, that is, visual-haptic information, during the driving of the software or program.

SUMMARY OF THE INVENTION

An embodiment of the present invention is directed to an apparatus and a method for providing users using various functions of a terminal with visual-haptic information when various functions of the terminal are used.

Another embodiment of the present invention is directed to an apparatus and a method for providing users with visual-haptic information through a visual-haptic keypad when software or program is driven in order to use various functions of a terminal, an apparatus for providing the visual-haptic information, and a terminal provided with the visual-haptic keypad.

Another embodiment of the present invention is directed to an apparatus and a method for providing users with visual-haptic information by changing a keypad layout of a terminal, button icons, and a sense of button manipulation (a sense of button touch) according to currently driven software or program, or the context of the software or program in a terminal having various functions, an apparatus for providing the visual-haptic information, and a terminal provided with the visual-haptic keypad.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a terminal for providing visual-haptic information includes: a visual-haptic keypad that displays and provides the visual-haptic information, wherein the visual-haptic keypad includes: a button frame of a plurality of buttons provided in the visual-haptic keypad; a visual display layer positioned under the button frame in a vertical direction on a basis of the button frame; and a haptic display layer positioned under the visual display layer in the vertical direction on the basis of the button frame, wherein the button frame and the visual display layer are fixedly bonded to boundary portions of the plurality of buttons.

In accordance with another embodiment of the present invention, an apparatus for providing visual-haptic information through a visual-haptic keypad includes: a setting unit that sets keypad information of the visual-haptic keypad; a control unit that outputs setting information on visual information and setting information on haptic information by using the keypad information; a visual information display unit that provides the visual information by using the setting information on visual information; and a haptic information display unit that provides the haptic information by using the setting information on haptic information, wherein the haptic information display unit displays a sense of button manipulation and a sense of button touch for a manipulated button through a plurality of haptic elements having heights changed according to manipulation of a plurality of buttons provided in the visual-haptic keypad, and the visual information display unit displays a keypad layout and a button icon for the manipulated button.

In accordance with another embodiment of the present invention, a method for providing visual-haptic information through a visual-haptic keypad includes: setting a keypad layout including a button size and a button type, an icon image according to a button state, an output force function, a button state, a button state critical value, and initial heights of buttons with respect to the visual-haptic keypad; generating setting information of the visual-haptic information provided through the visual-haptic keypad; displaying the keypad layout, a button icon, a sense of button manipulation, and a sense of button touch through the visual-haptic keypad according to the setting information; and recognizing manipulation of a plurality of buttons provided in the visual-haptic keypad and updating the setting information, wherein, in the displaying, the sense of button manipulation, the sense of button touch, the keypad layout, and the button icon for a manipulated button are displayed through a plurality of arranged haptic elements arranged such that heights of the plurality of haptic elements are changed according to manipulation of a plurality of buttons provided in the visual-haptic keypad.

DESCRIPTION OF SPECIFIC EMBODIMENTS

Figure 1:
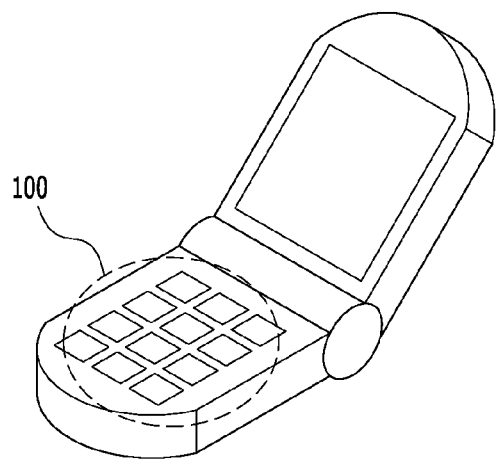
FIGS. 1 and 2 are diagrams schematically illustrating the structure of a visual-haptic keypad and a terminal in accordance with an embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The present invention proposes an apparatus and a method for providing users with visual-haptic information through a visual-haptic keypad of a terminal having various functions, an apparatus for providing the visual-haptic information, and a terminal provided with the visual-haptic keypad. An embodiment of the present invention proposes an apparatus and a method for providing users using various functions of the terminal with visual-haptic information through a visual-haptic keypad when various functions of the terminal are used, and a terminal for providing users with various functions using the visual-haptic keypad and the visual-haptic information providing apparatus.

Furthermore, the embodiment of the present invention proposes an apparatus and a method for providing users with visual-haptic information through the visual-haptic keypad when software or program is driven in order to use various functions of a terminal, an apparatus for providing the visual-haptic information, and a terminal provided with the visual-haptic keypad. Here, the embodiment of the present invention provides users with the visual-haptic information through the visual-haptic keypad by changing a keypad layout of a terminal, button icons, and a sense of button manipulation (a sense of button touch) according to currently driven software or program, or the context of the software or program in the terminal having various functions, and provides users with various functions using the visual-haptic keypad for providing the visual-haptic information through the terminal.

In other words, in the embodiment of the present invention, the keypad layout of the terminal, the button icons, and the sense of button manipulation (the sense of button touch) are changed according to the currently driven software or program, or the context of the software or program in the terminal having various functions, thereby easily providing users with the visual-haptic information when the software or program is driven in order to use various functions of the terminal. Specifically, in the embodiment of the present invention, the meaning of button icons attached to buttons of the terminal are easily mapped with the meaning of function keys to be used when driving the software or program, thereby allowing users to easily drive the software or program and thus to easily use various functions of the terminal. Moreover, in the embodiment of the present invention, the keypad layout, the button icons, and the sense of button manipulation (the sense of button touch) are easily changed according to functions of buttons used in software or program being driven in order to use various functions of the terminal, thereby easily providing users with the visual-haptic information during the driving of the software or program, and thus allowing users to easily and actively use various functions of the terminal.

In addition, in the embodiment of the present invention, when a user drives software or program in order to use various functions of the terminal, the visual-haptic information is adaptively provided to the user through the visual-haptic keypad provided in the terminal according to the driven software or program. In other words, in the embodiment of the present invention, the layout of the visual-haptic keypad and individual button icons of a plurality of buttons provided in the visual-haptic keypad are changed according to the software or program driven in order to use various functions of the terminal, or the context of the software or program, thereby adaptively providing the user with visual information through the visual-haptic keypad. Furthermore, in the embodiment of the present invention, a sense of manipulation (a sense of touch of the visual-haptic keypad) of the visual-haptic keypad or a sense of manipulation (a sense of button touch) of a plurality of buttons provided in the visual-haptic keypad is individually changed according to the software or program driven in order to use various functions of the terminal, or the context of the software or program, thereby adaptively providing the user with haptic information through the visual-haptic keypad.

In addition, in the embodiment of the present invention, the visual-haptic keypad for providing the visual-haptic information to users using various functions of the terminal as described above is provided in a terminal. Specifically, in the embodiment of the present invention, a programmable visual-haptic keypad is provided in the terminal as the visual-haptic keypad for adaptively providing users with the visual-haptic information according to software or program driven in order to use various functions, or the context of the software or program.

Here, the visual-haptic keypad provided in the terminal having various functions to provide users with the visual-haptic information in accordance with the embodiment of the present invention has no influence on buttons adjacent to a random button of a plurality of buttons provided in the visual-haptic keypad when a change occurs in the height of the random button. In other words, the visual-haptic keypad has a structure in which a visual display layer and a haptic display layer are not vertically attached to each other on the basis of a button frame, but the visual display layer and the button frame are fixed at portions corresponding to the boundaries of buttons. Consequently, even if the height of a random button of the plurality of buttons is changed, in other words, even if the height of the random button is changed through the manipulation of the visual-haptic keypad by a user for the use of the terminal, only the heights from the boundaries to the button frame surrounding the random button are changed without affecting the buttons adjacent to the random button. Hereinafter, the terminal provided with the apparatus for providing the visual-haptic information through the visual-haptic keypad in accordance with the embodiment of the present invention will be described in more detail with reference to FIGS. 1 and 2.

Figure 2:
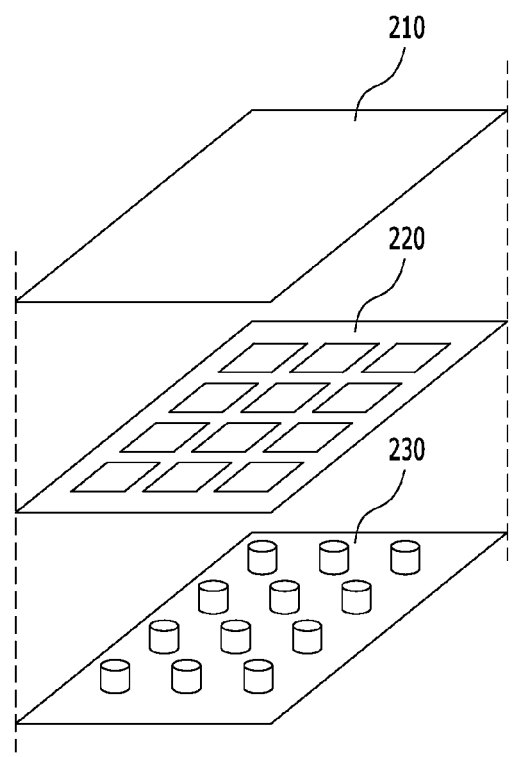

FIGS. 1 and 2 are diagrams schematically illustrating the structure of the visual-haptic keypad and the terminal in accordance with the embodiment of the present invention. FIG. 1 is a diagram schematically illustrating the terminal provided with the apparatus for providing the visual-haptic information through the visual-haptic keypad in accordance with the embodiment of the present invention, and FIG. 2 is a diagram schematically illustrating the visual-haptic keypad provided in the terminal in order to provide the visual-haptic information in accordance with the embodiment of the present invention.

Referring to FIGS. 1 and 2, the terminal has various functions, and includes a visual-haptic keypad 100 for providing a user with visual-haptic information when the user drives software or program of the terminal in order to use various functions of the terminal.

The visual-haptic keypad 100 adaptively provides the user with the visual-haptic information according to software or program driven in order to use various functions of the terminal, or the context of the software or program, and includes a programmable visual-haptic keypad. Furthermore, the visual-haptic keypad 100 includes a plurality of buttons for inputting/outputting information when the software or program of the terminal is driven in order to use various functions of the terminal. In order to allow the plurality of buttons to be correctly realized in the visual-haptic keypad 100, the visual-haptic keypad 100 includes a button frame 210 for fixing the positions of the buttons, a visual display layer 220 having flexibility to be bent on the basis of the button frame 210, and a haptic display layer 230 which is vertically modified downward from the visual display layer 220 or transfers haptic information. The visual display layer 220 is positioned on the haptic display layer 230, and the visual display layer 220 and the haptic display layer 230 are sequentially positioned in the vertical direction on the basis of the button frame 210.

As the plurality of buttons are provided in the visual-haptic keypad 100 as described above, the button frame 210 clearly fixes the boundaries of the buttons. Specifically, when a change occurs in the height of a random button of the plurality of buttons, the button frame 210 prevents buttons adjacent to the random button from being affected by the change. In other words, the visual-haptic keypad 100 has a structure in which the visual display layer 220 and the haptic display layer 230 are not vertically attached to each other on the basis of the button frame 210, but the visual display layer 220 and the button frame 210 are fixed at portions corresponding to the boundaries of the buttons. Consequently, even if the height of a random button of the plurality of buttons is changed, in other words, even if the height of the random button is changed through the manipulation of the keypad by a user for the use of the terminal, only the heights from the boundaries to the button frame surrounding the random button are changed without affecting the buttons adjacent to the random button.

The visual display layer 220 has flexibility as described above and may have various shapes by a transparent semiconductor element and the like. The haptic display layer 230 is positioned under the visual display layer 220, and may have a structure in which a plurality of small haptic elements are arranged according to the plurality of buttons provided in the visual-haptic keypad 100. Hereinafter, the plurality of buttons provided in the visual-haptic keypad of the terminal in accordance with the embodiment of the present invention will be described in more detail with reference to FIGS. 3 to 6.

FIGS. 3 to 6 are diagrams schematically illustrating the structure of the button in the visual-haptic keypad of the terminal in accordance with the embodiment of the present invention.

Referring to FIGS. 3 to 6, the visual-haptic keypad includes the plurality of buttons as described above. In relation to the plurality of buttons, visual display layers 320, 420, 520 and 620 and haptic display layers 330, 430, 530 and 630 are sequentially positioned in the vertical direction on the basis of button frames 310, 410, 510 and 610, respectively. The haptic display layer 330 includes a plurality of small haptic elements 332, 334 and 336 arranged according to the sizes of the plurality of buttons, the haptic display layer 430 includes a plurality of small haptic elements 432, 434 and 436 arranged according to the sizes of the plurality of buttons, the haptic display layer 530 includes a plurality of small haptic elements 532, 534 and 536 arranged according to the sizes of the plurality of buttons, and the haptic display layer 630 includes a plurality of small haptic elements 632, 634 and 636 arranged according to the sizes of the plurality of buttons.

Figure 3:
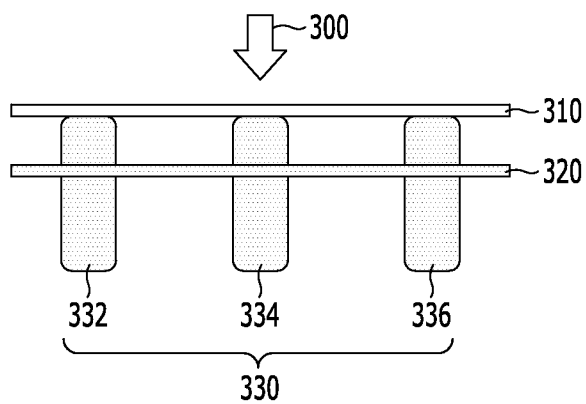
FIGS. 3 to 6 are diagrams schematically illustrating the structure of a button in a visual-haptic keypad of a terminal in accordance with an embodiment of the present invention.
Figure 4:
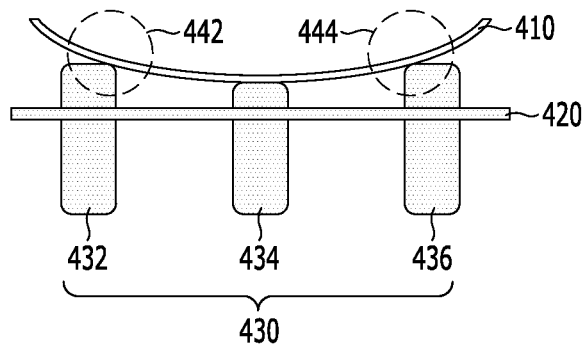

As illustrated in FIGS. 3 and 4, when the visual-haptic keypad has a structure in which the visual display layers 320 and 420 and the haptic display layers 330 and 430 are vertically attached to each other on the basis of the button frames 310 and 410, respectively, the plurality of buttons provided in the visual-haptic keypad are provided in narrow spaces with the integration and miniaturization of a terminal. Therefore, when a user manipulates the visual-haptic keypad in order to use various functions of the terminal, in other words, when the user presses random buttons of the visual-haptic keypad in order to input information, not only the heights of the haptic elements 334 and 434 corresponding to the random buttons are changed, but also the heights of the haptic elements 332, 336, 432 and 436 corresponding to buttons adjacent to the random buttons are changed due to the above-mentioned structure (refer to reference numerals 442 and 444).

That is, since the visual-haptic keypad has the structure in which the visual display layers 320 and 420 and the haptic display layers 330 and 430 are vertically attached to each other on the basis of button frames 310 and 410, respectively, when a user presses random buttons of the visual-haptic keypad (refer to reference numeral 300), both the random buttons and buttons adjacent to the random buttons are also simultaneously pressed (refer to reference numerals 442 and 444). As a result, software or program of the terminal is not driven according to the intention of the user, causing difficulty in using the terminal.

Figure 5:
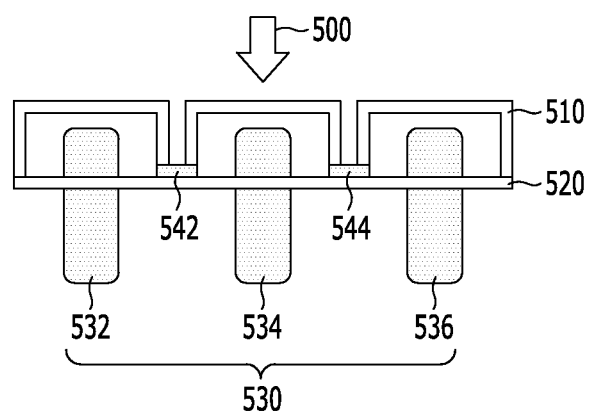
Figure 6:
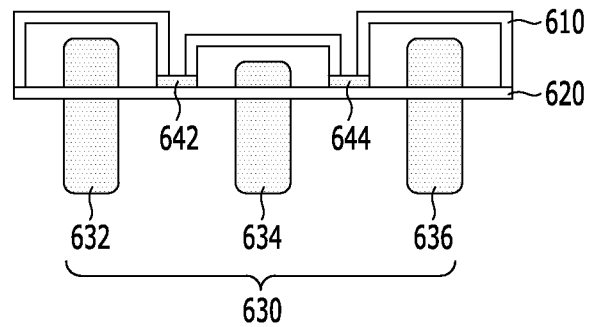

However, as illustrated in FIGS. 5 and 6, in accordance with the embodiment of the present invention, when the visual-haptic keypad has a structure in which the visual display layers 520 and 620 and the haptic display layers 530 and 630 are vertically attached to each other on the basis of the button frames 510 and 610, respectively, in such a manner that the visual display layer 520 and the button frame 510 are fixed at portions 542 and 544 corresponding to the boundaries of the buttons and the visual display layer 620 and the button frame 610 are fixed at portions 642 and 644 corresponding to the boundaries of the buttons.

That is, the button frame 510 and the visual display layer 520 are fixedly bonded to the boundary portions 542 and 544 of the plurality of buttons provided in the visual-haptic keypad and the button frame 610 and the visual display layer 620 are fixedly bonded to the boundary portions 642 and 644 of the plurality of buttons, and the plurality of buttons are separately provided and independently operate in narrow spaces with the integration and miniaturization of the terminal. Therefore, when a user manipulates the visual-haptic keypad in order to use various functions of the terminal, in other words, when the user presses random buttons of the visual-haptic keypad in order to input information (refer to reference numeral 500), only the heights of the haptic elements 534 and 634 corresponding to the random buttons are changed, and the heights of the haptic elements 532, 534, 632 and 636 corresponding to buttons adjacent to the random buttons are not changed because the button frame 510 and the visual display layer 520 are fixedly bonded to the boundary portions 542 and 544 and the button frame 610 and the visual display layer 620 are fixedly bonded to the boundary portions 642 and 644. That is, in the visual-haptic keypad, even if the height of a random button of the plurality of buttons is changed, in other words, even if the height of the random button is changed through the manipulation of the visual-haptic keypad by the user for the use of the terminal, only the heights from the boundary portions 542 and 544 to the button frame 510 surrounding the random button and only the heights from the boundary portions 642 and 644 to the button frame 610 surrounding the random button are changed, that is, only the heights of the haptic elements 534 and 634 corresponding to the random buttons are changed without affecting buttons adjacent to the random buttons, that is, the haptic elements 532, 536, 632 and 636 corresponding to the adjacent buttons.

The visual-haptic keypad, which inputs/outputs (provides) visual-haptic information when information for driving software or program of the terminal is input (provided) and the software or program is driven in order to use various functions of the terminal as described above, is provided as a programmable visual-haptic keypad as described in FIGS. 5 and 6, and is provided in the terminal as a visual-haptic information providing apparatus. That is, in the embodiment of the present invention, the visual-haptic keypad has the structure in which the visual display layers 520 and 620 and the haptic display layers 530 and 630 are vertically attached to each other on the basis of the button frames 510 and 610, respectively, in such a manner that the button frame 510 and the visual display layer 520 are fixedly bonded to the boundary portions 542 and 544 of the plurality of buttons and the button frame 610 and the visual display layer 620 are fixedly bonded to the boundary portions 642 and 644 of the plurality of buttons, so that the plurality of buttons are separately provided and independently operate, that is, the height of only a button manipulated by the user in order to input information is changed.

Thus, when the user presses random buttons of the visual-haptic keypad in order to input information for using various functions of the terminal (refer to reference numeral 500), the heights of only the haptic elements 534 and 634 corresponding to the random buttons are changed. Consequently, the visual-haptic keypad in accordance with the embodiment of the present invention provides the user with visual-haptic information by changing a keypad layout of the terminal, button icons, and a sense of button manipulation (a sense of button touch) according to software or program being driven in order to use various functions of the terminal, or the context of the software or program, and allows the user to easily and actively use various functions of the terminal. Hereinafter, an apparatus for providing visual-haptic information through the visual-haptic keypad in accordance with the embodiment of the present invention will be described in more detail with reference to FIG. 7.

Figure 7:
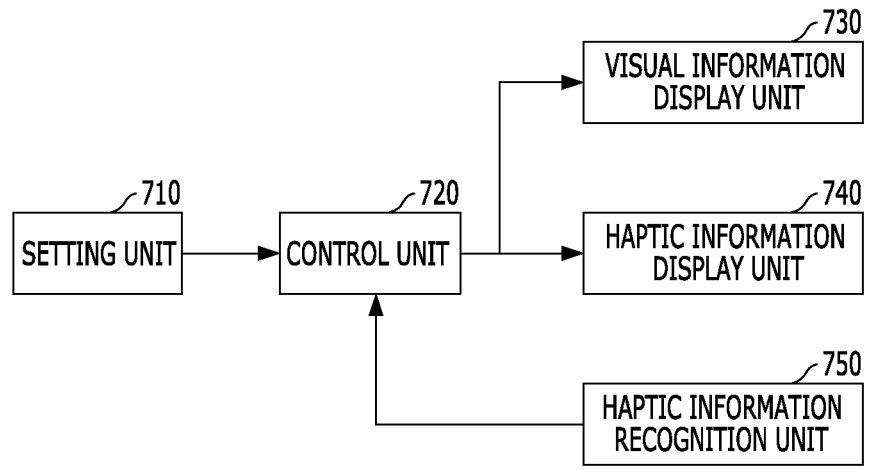
FIG. 7 is a diagram schematically illustrating the structure of a visual-haptic information providing apparatus in accordance with an embodiment of the present invention.

FIG. 7 is a diagram schematically illustrating the structure of a visual-haptic information providing apparatus in accordance with the embodiment of the present invention.

Referring to FIG. 7, the visual-haptic information providing apparatus performs operations for inputting (providing) information for driving software or program of the terminal in order to use various functions of the terminal, or inputting/outputting (providing) information at the time of driving of the software or program through the visual-haptic keypad as described above, and specifically, provides the visual-haptic information by changing a keypad layout, button icons, and a sense of button manipulation (a sense of button touch) according to the currently driven software or program in the terminal provided with a programmable visual-haptic keypad as the visual-haptic keypad.

In more detail, the visual-haptic information providing apparatus for providing the visual-haptic information through the visual-haptic keypad provided in the terminal as described above includes a setting unit 710, a control unit 720, a visual information display unit 730, a haptic information display unit 740, and a haptic information recognition unit 750. The setting unit 710 sets keypad information of the visual-haptic keypad. The control unit 720 controls and sets the provision of the visual-haptic information through the visual-haptic keypad according to the keypad information (e.g., a keypad setting command) set by the setting unit 710. The visual information display unit 730 displays visual information, for example, a keypad layout and button icons, according to the control and setting of the control unit 720. The haptic information display unit 740 displays haptic information, for example, a sense of button manipulation (a sense of button touch), according to the control and setting of the control unit 720. The haptic information recognition unit 750 recognizes manipulation (touch) of a user to the plurality of buttons provided in the visual-haptic keypad, in other words, recognizes haptic information according to the input of information.

The setting unit 710 sets the keypad information for changing the keypad setting of the visual-haptic keypad according to the context of software or program at the time of driving of and during the software or program, and outputs the set keypad information to the control unit 720 as the keypad setting command. The keypad setting command, which is the keypad information, includes keypad layout information, wherein the keypad layout information includes information on a button size and a button type. Furthermore, the keypad setting command includes button attribute information of the plurality of buttons provided in the visual-haptic keypad, wherein the button attribute information includes icon image information according to a button state, output force function information, button state information, a button state critical value, information on the initial heights of buttons, and the like.

The icon image information according to a button state includes images for inputting numerals, the Korean alphabet, English characters, special characters and the like, software or program being driven, images for function keys to be used in a game, and the like. The output force function information includes information for changing the heights of the haptic elements provided in the buttons as described above, and the information on the initial heights of buttons includes information on the initial heights of the haptic elements. The button state information includes information on an idle state and a touch state according to the manipulation of a button by a user, a pressing state and a click state of a button, and the like. The button state critical value includes a critical value for the touch state, the pressing state and the click state of the button. When the buttons are in the idle state, the haptic elements provided in the buttons may have initially set heights according to the information on the initial heights of buttons.

In addition, the setting unit 710 sets the above-mentioned keypad information according to software or program driven in order to use various functions of the terminal, or the context of software or program, stores the set keypad information in the form of a keypad attribute profile, and outputs the stored keypad attribute profile to the control unit 720 as the keypad setting command such that visual-haptic information is adaptively provided through the visual-haptic keypad at the time of driving of the software or program, thereby allowing a user to use various types of keypads.

The control unit 720 controls the visual-haptic information to be provided through the visual information display unit 730 and the haptic information display unit 740 according to the keypad setting command (the keypad information). In more detail, the control unit 720 receives the keypad attribute profile from the setting unit 710 as the keypad information as described above, and sets and controls the visual information display unit 730 to display a keypad layout (a button layout) and button icons as visual information by using the keypad attribute profile. Here, the control unit 720 generates setting information on the visual information and outputs the setting information to the visual information display unit 730 such that the visual information display unit 730 provides the visual information by displaying the keypad layout (the button layout) and the button icons.

Furthermore, the control unit 720 sets and controls the haptic information display unit 740 to display haptic information of a button, for example, a sense of button manipulation (a sense of button touch), as haptic information by using the keypad attribute profile. Here, the control unit 720 generates setting information on the haptic information and outputs the setting information to the haptic information display unit 740 such that the haptic information display unit 740 provides the haptic information by displaying the sense of button manipulation (the sense of button touch). Furthermore, the control unit 720 does not only control and set the haptic information recognition unit 750 to recognize the manipulation of a button by a user in order to use various functions of the terminal, in other words, the input of information, but also controls the visual information display unit 730 and the haptic information display unit 740 to provide the visual-haptic information according to the recognized information, that is, the manipulation of the button. That is, the control unit 720 controls the visual information display unit 730 and the haptic information display unit 740 to provide the visual-haptic information according to the keypad attribute profile and the manipulation of the button. To this end, the control unit 720 generates the setting information on the visual-haptic information and outputs the setting information to the visual information display unit 730 and the haptic information display unit 740.

The visual information display unit 730 receives the setting information on the visual information from the control unit 720, and provides (outputs) the visual information by displaying the keypad layout (the button layout) and the button icons based on the received setting information. The visual information display unit 730 is realized by the visual display layer 220 in the visual-haptic keypad described in FIG. 2.

The haptic information display unit 740 receives the setting information on the haptic information from the control unit 720, and provides (outputs) the haptic information by displaying the sense of button manipulation (the sense of button touch) for each button provided in the visual-haptic keypad based on the received setting information. The haptic information display unit 740 is realized by the haptic display layer 230 in the visual-haptic keypad described in FIG. 2. As described in FIGS. 3 to 6, the heights of the plurality of haptic elements provided in the buttons are changed, so that the haptic information is provided. In addition, as described in FIGS. 5 and 6, as the boundary portions of the plurality of buttons are bonded so that the buttons are separately provided and independently operate, the haptic information is provided such that a user easily and actively uses various functions of the terminal.

The haptic information recognition unit 750 recognizes a change in the heights of the plurality of haptic elements provided in the buttons according to the manipulation of the button by the user, that is, the input of the information, and outputs recognition information based on the change in the heights of the plurality of haptic elements to the control unit 720. The recognition information includes output force function information corresponding to button touch, button pressing and button click by the user, and information on the heights of the plurality of haptic elements. Furthermore, the haptic information recognition unit 750 detects the change in the heights of the plurality of haptic elements provided in the buttons by a predetermined number of times or more per a unit time in order to more accurately recognize the manipulation of the button and the input of the information by the user, and outputs the recognition information based on the detection to the control unit 720.

The control unit 720 receives the output force function information and the height information from the haptic information recognition unit 750, and calculates values of force applied to buttons and values of the heights of the plurality of haptic elements at the time of manipulation of the buttons according to the keypad attribute profile by using the received output force function information and height information. Furthermore, the control unit 720 outputs the calculated values to the haptic information display unit 740, and controls the haptic information display unit 740 to provide the haptic information, that is, the sense of button manipulation (the sense of button touch), according to the calculated values.

Here, the control unit 720 receives the output force function information and the height information from the haptic information recognition unit 750 to check the current state of a visual-haptic change button, for example, an idle state, a touch state, a pressing state, and a click state, and controls the visual information display unit 730 and the haptic information display unit 740 to provide the visual-haptic information by changing the button icons, the sense of button manipulation, and the sense of button touch according to the checked button state. At this time, the control unit 720 compares the current values of the heights of the plurality of haptic elements with critical values according to the set button state, that is, a touch state critical value, a pressing state critical value, or a click state critical value, and checks the state of the visual-haptic change button.

As described above, the haptic information recognition unit 750 detects the change in the heights of the plurality of haptic elements provided in the buttons by a predetermined number of times or more per a unit time in order to more accurately recognize the manipulation of the button and the input of the information by the user, and outputs the recognition information based on the detection to the control unit 720, so that the control unit 720 controls the visual information display unit 730 and the haptic information display unit 740 to provide the visual information and the haptic information by using the recognition information and the keypad attribute profile, respectively.

In other words, the control unit 720 calculates the output force values and the values of the heights of the plurality of haptic elements through the output force function information and the height information included in the recognition information, compares the calculated values with the button state critical values of the keypad attribute profile, changes the state of each button according to a comparison result, and controls the visual information display unit 730 to display (provide) button icons (i.e., visual information) changed according to a change in the state of each button. Furthermore, the control unit 720 controls the haptic information display unit 740 to display (provide) a sense of button manipulation (a sense of button touch) (i.e., haptic information) of each button changed according to the change in the state of each button. Hereinafter, an operation for providing the visual-haptic information through the visual-haptic keypad in accordance with the embodiment of the present invention will be described in more detail with reference to FIG. 8.

Figure 8:
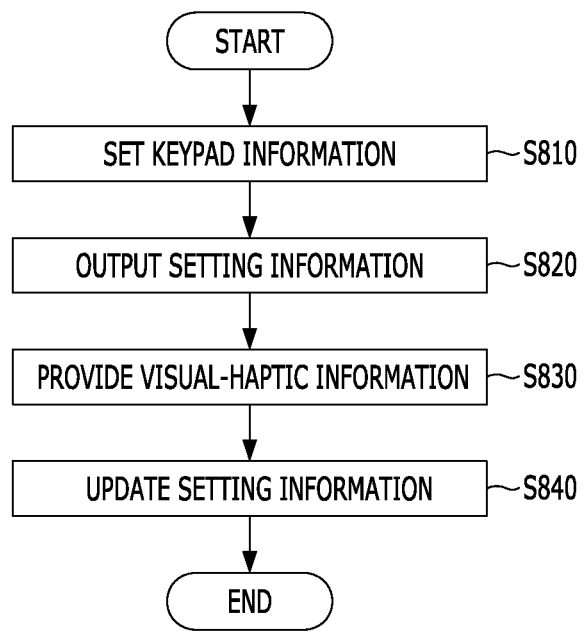
FIG. 8 is a diagram schematically illustrating an operation by which a visual-haptic keypad provides visual-haptic information in accordance with an embodiment of the present invention.

FIG. 8 is a diagram schematically illustrating an operation by which the visual-haptic keypad provides the visual-haptic information in accordance with the embodiment of the present invention.

Referring to FIG. 8, in step S810, the visual-haptic keypad sets the keypad information for changing the keypad setting of the visual-haptic keypad according to the context of software or program of the terminal at the time of driving of and during the software or program for the use of various functions of the terminal. The keypad information includes keypad layout information and button attribute information of the plurality of buttons provided in the visual-haptic keypad. The keypad layout information includes information on a button size and a button type, and the button attribute information includes icon image information according to a button state, output force function information, button state information, a button state critical value, information on the initial heights of buttons, and the like. The keypad information is stored in the form of a keypad attribute profile. The keypad attribute profile is used for displaying a keypad layout, button icons, and a sense of button manipulation (a sense of button touch) for providing visual-haptic information.

In step S820, setting information on visual information is generated through the keypad attribute profile such that the visual information is provided by displaying the keypad layout (the button layout) and the button icons, and setting information on haptic information is generated through the keypad attribute profile such that the haptic information is provided by displaying the sense of button manipulation (the sense of button touch). In step S830, the keypad layout (the button layout) and the button icons are displayed through the setting information to provide the visual information, and the sense of button manipulation (the sense of button touch) is displayed through the setting information to provide the haptic information.

In step S840, a change in the heights of the plurality of haptic elements provided in the buttons according to user's manipulation of each button provided in the visual-haptic keypad, in other words, input of formation, is recognized, and the setting information (i.e., the setting information on the visual information and the setting information on the haptic information) is updated in order to provide a user with visual-haptic information according to the change in the heights of the plurality of haptic elements. Since the update of the setting information on the visual information and the setting information on the haptic information, that is, the provision of the visual information through the display of the keypad layout (the button layout) and the button icons and the provision of the haptic information through the display of the sense of button manipulation (the sense of button touch) based on the recognition of the change in the heights of the plurality of haptic elements according to the user's manipulation of each button, has been previously described in detail, detailed description thereof will be omitted.

So far, the case in which the visual-haptic keypad performs the operation for providing the visual-haptic information has been mainly described with reference to FIG. 8. However, the operation may be performed by the visual-haptic information providing apparatus, or a terminal including the visual-haptic keypad and the visual-haptic information providing apparatus, as well as the visual-haptic keypad. Furthermore, the visual-haptic keypad may serve as the visual-haptic information providing apparatus.

In accordance with the embodiment of the present invention, the keypad layout of the terminal, the button icons, and the sense of button manipulation (the sense of button touch) are changed according to the currently driven software or program, or the context of the software or program in the terminal having various functions, thereby easily providing users with the visual-haptic information when the software or program is driven in order to use various functions of the terminal. Specifically, the meaning of button icons attached to buttons of the terminal is easily mapped with the meaning of function keys to be used when driving the software or program, thereby allowing the users to easily drive the software or program and thus to easily use various functions of the terminal.

Moreover, in the embodiment of the present invention, the keypad layout, the button icons, and the sense of button manipulation (the sense of button touch) are easily changed according to the functions of buttons used in software or program being driven in order to use various functions of the terminal, thereby easily providing the users with the visual-haptic information during the driving of the software or program, and thus allowing the users to easily and actively use various functions of the terminal.

While the present invention has been described with respect to the specific embodiments, it will be apparent to those skilled in the art that various changes and modifications may be made without departing from the spirit and scope of the invention as defined in the following claims.

What is claimed is:

1. A terminal comprising:
a visual-haptic keypad that displays and provides the visual-haptic information, wherein the visual-haptic keypad comprises:
 a button frame of a plurality of buttons provided in the visual-haptic keypad;
 a visual display layer positioned under the button frame in a vertical direction on a basis of the button frame; and
 a haptic display layer positioned under the visual display layer in the vertical direction on the basis of the button frame;
wherein the button frame and the visual display layer are fixedly bonded to boundary portions of the plurality of buttons.

2. The terminal of claim 1, wherein each button is separately provided and independently operates through bonding of the button frame and the visual display layer at the boundary portions.

3. The terminal of claim 1, wherein the haptic display layer includes a plurality of haptic elements arranged corresponding the plurality of buttons, and heights of the plurality of haptic elements are changed by manipulation of each button.

4. The terminal of claim 3, wherein, when a random button of the plurality of buttons is manipulated, a height of only a haptic element, which corresponds to the random button among the plurality of haptic elements, is changed.

5. The terminal of claim 1, wherein the visual display layer provides visual information by displaying a keypad layout and a button icon by manipulation of each button.

6. The terminal of claim 1, wherein the haptic display layer provides haptic information by displaying a sense of button manipulation and a sense of button touch by manipulation of each button.

7. The terminal of claim 1, wherein the haptic display layer includes a plurality of haptic elements arranged such that heights of the plurality of haptic elements are changed by manipulation of each button, and the visual-haptic keypad provides the visual-haptic information through the visual display layer and the haptic display layer according to a change in a height of a haptic element corresponding to a manipulated button among the plurality of haptic elements.

8. The terminal of claim 7, wherein the visual display layer displays a keypad layout and a button icon according to the visual-haptic information.

9. The terminal of claim 7, wherein the haptic display layer displays a sense of button manipulation and a sense of button touch according to the visual-haptic information.

10. The terminal of claim 1, wherein the visual-haptic keypad provides the visual-haptic information through the visual display layer and the haptic display layer by using a keypad layout including a button size and a button type, and button attribute information.

11. The terminal of claim 10, wherein the button attribute information includes icon image information according to a button state, output force function information, button state information, a button state critical value, and information on initial heights of buttons.

12. An apparatus comprising:
a visual-haptic keypad comprising:
 a plurality of buttons;
 a haptic display layer comprising a plurality of haptic elements having heights changed according to manipulation of the plurality of buttons;
 a button frame fixedly bonded to at least a first boundary of each of the plurality of buttons;
 a visual display layer fixedly bonded to a least a second boundary of each of the plurality of buttons, wherein the visual display layer is disposed between the button frame and the haptic display layer;
a setting unit configured to set keypad information of the visual-haptic keypad;
a control unit configured to output visual information settings and haptic information settings according to the keypad information;
a visual information display unit configured to display the visual information according to the visual information settings, wherein the visual information includes a keypad layout and at least one button icon for a manipulated button of the plurality of buttons; and
a haptic information display unit configured to display the haptic information according to the haptic information settings, wherein the haptic information display unit displays a sense of button manipulation and a sense of button touch for the manipulated button.

13. The apparatus of claim 12, wherein a height of only a haptic element corresponding to the manipulated button is changed and a height of haptic elements adjacent to the manipulated button are not changed.

14. The apparatus of claim 12, wherein the setting unit sets a keypad layout including a button size, a button type, and button attribute information as the keypad information, and stores the keypad information in a form of a keypad attribute profile.

15. The apparatus of claim 14, wherein the button attribute information includes icon image information according to a button state, output force function information, button state information, a button state critical value, and information on initial heights of buttons.

16. The apparatus of claim 14, wherein the control unit outputs setting information on the sense of button manipulation, the sense of button touch, the keypad layout, and the button icon to the visual information display unit and the haptic information display unit according to the keypad attribute profile.

17. The apparatus of claim 12, further comprising a haptic information recognition unit configured to recognize a change in a height of a haptic element corresponding to the manipulated button and outputs recognition information to the control unit, wherein the control unit calculates an output force value and a height value by using the recognition information and changes a state of at least one button according to the output force value and the height value.

18. The apparatus of claim 17, wherein the visual information display unit displays a button icon changed according to a change in the state of the at least one button, and the haptic information display unit displays a sense of button manipulation and a sense of button touch of a button changed according to the change in the state of the at least one button.

19. A method comprising:
setting a keypad layout including a button size and a button type, an icon image according to a button state, an output force function, a button state, a button state critical value, and initial heights of buttons for a visual-haptic keypad, wherein the visual-haptic keypad comprises:
 a plurality of buttons;
 a haptic display layer comprising a plurality of haptic elements having heights changed according to manipulation of the plurality of buttons;
 a button frame fixedly bonded to at least a first boundary of each of the plurality of buttons;

a visual display layer fixedly bonded to a least a second boundary of each of the plurality of buttons, wherein the visual display layer is disposed between the button frame and the haptic display layer;

generating setting information of the visual-haptic information provided through the visual-haptic keypad;

displaying the keypad layout, a button icon, a sense of button manipulation, and a sense of button touch through the visual-haptic keypad according to the setting information; and recognizing manipulation of a plurality of buttons provided in the visual-haptic keypad and updating the setting information;

for a manipulated button, arranging the plurality of haptic elements such that heights of the plurality of haptic elements are changed according to manipulation of the plurality of buttons.

20. The method of claim 19, wherein boundary portions of the plurality of buttons are bonded, such that a height of only a haptic element corresponding to the manipulated button is changed and a height of haptic elements adjacent to the manipulated button are not changed.

\* \* \* \* \*